(12) United States Patent
Wu

(10) Patent No.: US 6,414,467 B1
(45) Date of Patent: Jul. 2, 2002

(54) CHARGING DEVICE WITH BATTERY DETECTION AND PROTECTION FUNCTION

(76) Inventor: Ten-Der Wu, 4F-8, No. 20, Lane 50, Tien Mou E. Rd., Taipei (TW)

( * ) Notice: Subject to any disclaimer, the term of this patent is extended or adjusted under 35 U.S.C. 154(b) by 0 days.

(21) Appl. No.: 09/897,018

(22) Filed: Jul. 3, 2001

(51) Int. Cl.[7] .............................................. H01M 10/46
(52) U.S. Cl. ..................................... 320/134; 320/136
(58) Field of Search ................................. 320/127, 128, 320/133, 134, 136, 137, 155, 158, 162, 163, 164

(56) References Cited

U.S. PATENT DOCUMENTS

| 4,484,130 A | * | 11/1984 | Lowndes et al. |
| 4,820,966 A | * | 4/1989 | Fridman |
| 5,581,170 A | * | 12/1996 | Manumano et al. |
| 5,796,239 A | * | 8/1998 | Van Phuoc et al. |

* cited by examiner

*Primary Examiner*—Edward H. Tso
(74) *Attorney, Agent, or Firm*—Rosenberg, Klein & Lee

(57) ABSTRACT

A charging device with battery detection and protection function comprises a controlling circuit between a charging circuit and a battery. The controlling circuit uses the characteristics of pole assembly of battery for battery detection and protection function. Moreover, the controlling circuit prevents the explosion of battery due to charging of damaged battery.

4 Claims, 4 Drawing Sheets

CHARGING DEVICE WITH BATTERY DETECTION AND PROTECTION FUNCTION

FIELD OF THE INVENTION

The present invention relates to a charging device with battery detection and protection function, especially to a charging device providing battery detection and protection function by exploiting the characteristics of pole assembly of battery.

BACKGROUND OF THE INVENTION

The conventional Ni battery set generally provides voltage of 3.0V, 4.5V and 6V by combination of 1.2–1.3V batteries. The conventional Pb battery generally provides 6V or 12V voltage by combination of a plurality poles. For example, a 12V Pb battery can be realized by a six-pole assembly and each pole provides 2.0–2.3 V alone. If one of the poles has problem, the overall voltage provided by the 12V Pb battery with six poles is only 10.0–11.5V. The Ni and Pb battery is generally provided with full-charging or capacity detection unit to discriminate the charging condition thereof. However, the full-charging or capacity detection unit may mistake the failure of electrode for insufficient charging condition. As a result, the battery may be exploded due to continuous charging.

SUMMARY OF THE INVENTION

It is the object of the present invention to provide a charging device with battery detection and protection function by exploiting the characteristics of pole assembly of battery.

In one aspect of the invention, the charging device of the present invention has a controlling circuit between a charging circuit and a battery and using the characteristics of pole assembly of battery for battery detection and protection function.

In another aspect of the invention, the charging device of the present invention can prevent the explosion of battery due to charging of damaged battery.

The various objects and advantages of the present invention will be more readily understood from the following detailed description when read in conjunction with the appended drawing, in which:

DETAILED DESCRIPTION OF THE INVENTION

Figure 1:
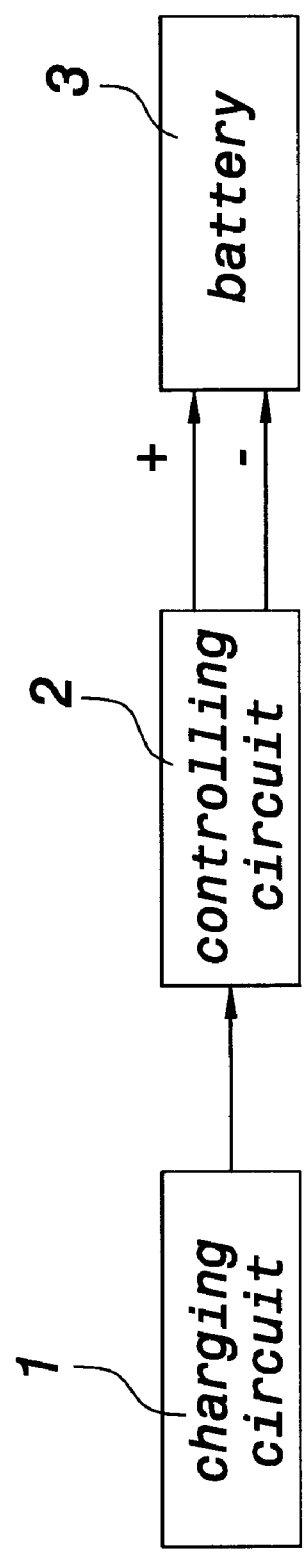
FIG. 1 shows the application of the present invention.
Figure 2:
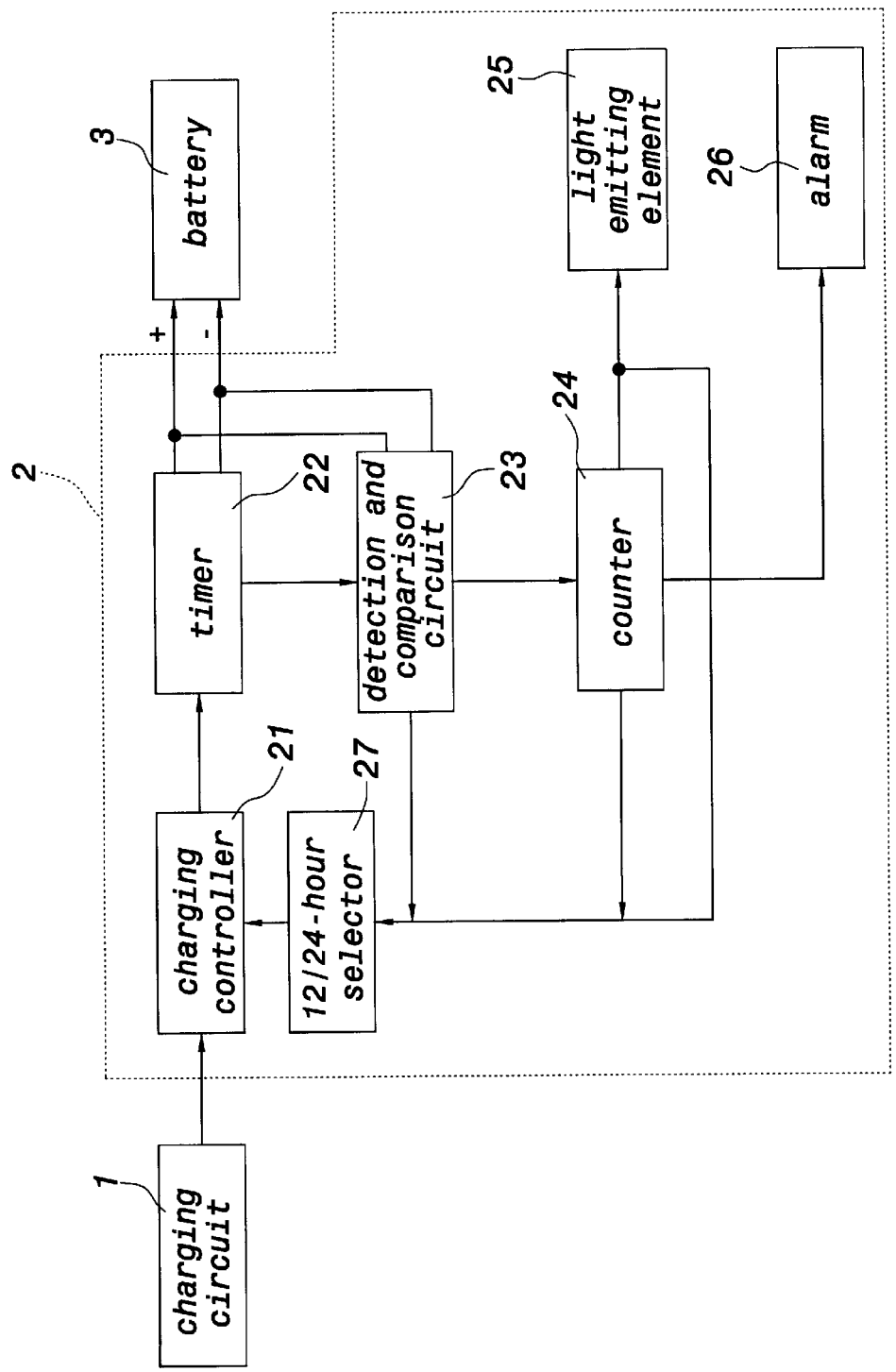
FIG. 2 shows the block diagram of the present invention.
Figure 3:
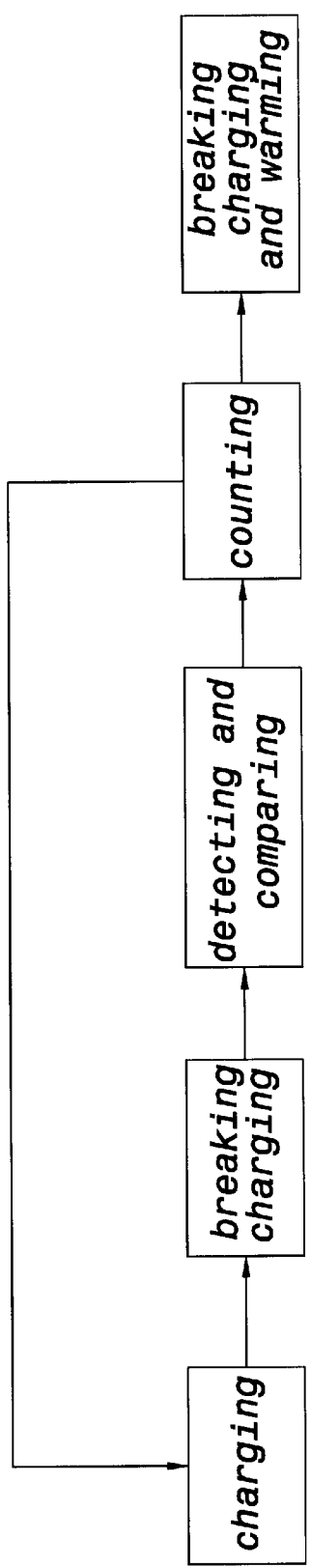
FIG. 3 shows the operation sequence of the present invention.

With reference now to FIGS. 1 to 3, the present invention provides a charging device with battery detection and protection function. The charging device comprises at least a controlling circuit 2 between a charging circuit 1 and a battery 3 to be charged. The controlling circuit provides battery detection and protection function by exploiting the characteristics of pole assembly of battery.

The controlling circuit 2 comprises a charging controller 21, a timer 22, a detection and comparison circuit 23, a counter 24, a light emitting element 25, an alarm 26 and a 12/24-hour selector 27.

The charging controller 21 has an input connected to an output of the charging circuit 1 and the charging controller 21 has an output connected to an input of the timer 22. The timer 22 has an output connected to the battery 3.

The timer 22 is used to control the recharging cycle for the battery 3, which comprises a charging period and a breaking (non-charging) period. Therefore, the charging controller 21 can charge the battery 3 according to the recharging cycle. For example, the charging controller 21 firstly charges the battery 3 for 70 mins (charging period) and then breaks the charging for 10 mins (breaking period). The cycle is repeated for a predetermined times.

The detection and comparison circuit 23 is connected to the charging controller 21, the timer 22, the battery 3, respectively. The detection and comparison circuit 23 has an output connected to the counter 24 to count the charging and breaking times for the battery 3. The counter 24 has an output connected to the light emitting element 25 and the alarm 26. The 12/24-hour selector 27 is connected between the counter 24 and the charging controller 21. The 12/24-hour selector 27 is functioned to terminate the recharging cycle after a predetermined termination time.

The detection and comparison circuit 23 detects the voltage level of the battery 3 after one recharging cycle for the battery 3 is over. When the detected level is less than a threshold value equal to the maximal voltage of the battery 3 with one less pole, the counter 24 counts one wrong detection result. If the times of wrong detection result exceeds a critical value, the light emitting element 25 flashes and the alarm 26 raises alarm.

For a 12V Pb battery composed of six pole with each pole having 2.0–2.3V voltage, the voltage of the Pb battery is only 10.0–11.5 V if one pole thereof is damaged. After a predetermined termination time determined by the 12/24-hour selector 27 is over, the power provided by the charging circuit 1 is automatically switched off to prevent explosion.

Figure 4:
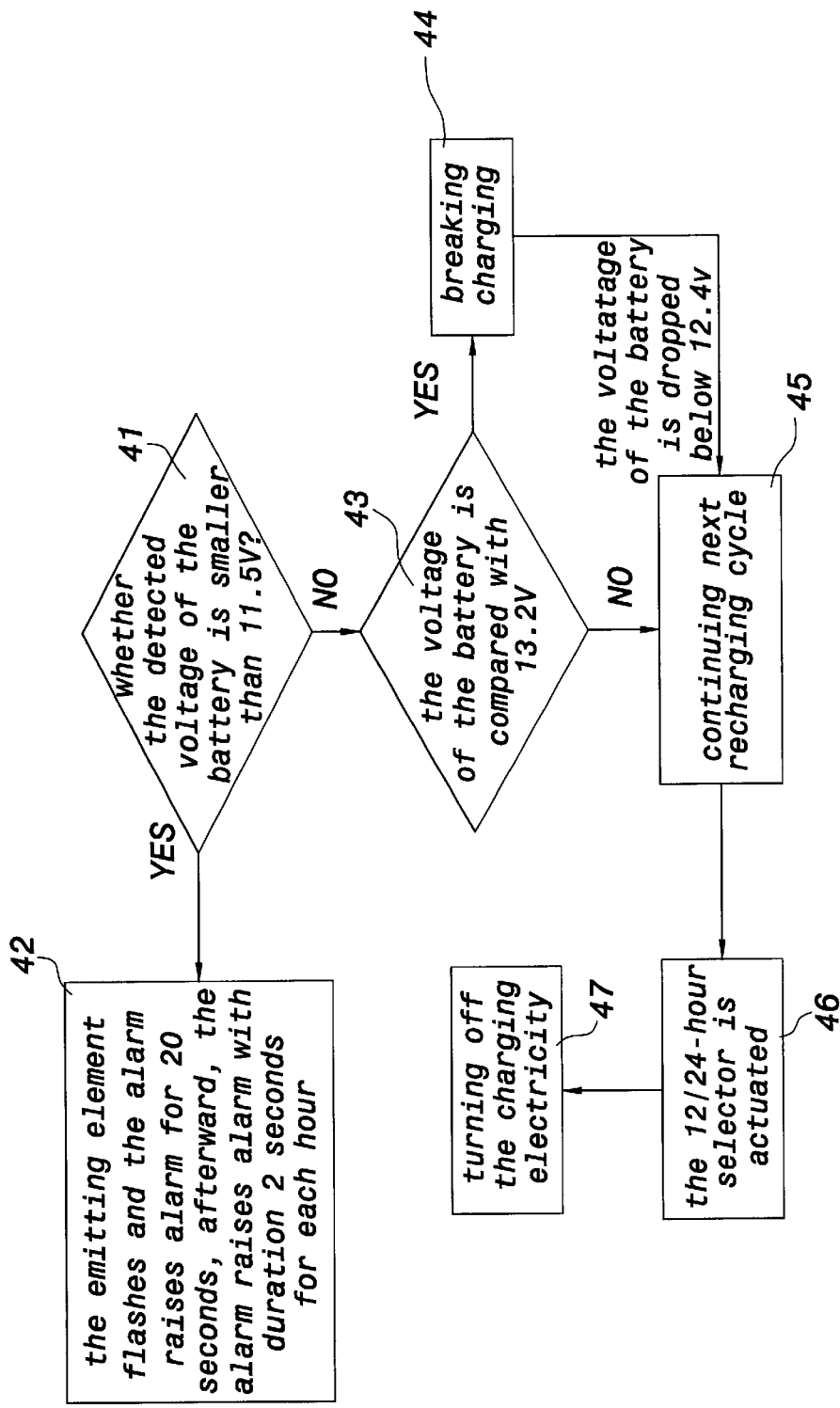
FIG. 4 shows the flowchart explaining the operation of the inventive charging device.

FIG. 4 shows the flowchart explaining the operation of the inventive charging device with battery detection and protection function used for a 12V Pb battery. At step 41, the detection and comparison circuit 23 judges whether the detected voltage of the 12V Pb battery is smaller than 11.5V?

If the voltage of the 12V Pb battery after charging operation is smaller than 11.5V, the battery is a damaged battery. At step 42, the emitting element 25 flashes and the alarm 26 raises alarm for 20 seconds and the power is turned off. Afterward, the alarm 26 raises alarm with duration 2 seconds for each hour.

If the voltage of the 12V Pb battery after charging operation is larger than 11.5V, then the voltage of the Pb battery is compared with 13.2V at step 43.

If the voltage of the Pb battery is larger than 13.2V, the battery is of full charge and the charging is seized at step 43. At this time, the emitting element 25 is kept lighting and the detection and comparison circuit 23 still monitors the status of the battery. Once the voltage of the battery is dropped below 12.4V, the battery is charged again in next cycle at step 45. If the voltage of the battery is dropped below 13.2V, the battery is charged again in next cycle at step 45.

Moreover, if the voltage of the battery is still smaller than 13.2V after a predetermined termination time, the 12/24-hour selector 27 is actuated at step 46 and turns off the charging electricity at step 47. Therefore, the explosion of battery due to aging or damage thereof can be prevented.

To sum up, the charging device with battery detection and protection function of the present invention has following advantages:

1. The charging condition of the battery can be manifested by the characteristics of battery pole.
2. The explosion of damaged battery can be prevented.
3. The provision of 12/24-hour selector can set the time to turn off charging electricity, thus providing more safety.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A charging device with battery detection and protection function, which comprises a controlling circuit between a charging circuit and a battery, the controlling circuit having
   - a charging controller connected to an output of the charging circuit and controlling the charging circuit for charging or non-charging the battery in a charging time and a non-charging time, respectively;
   - a timer connected between an output of the charging controller and the battery, and controlling a recharging cycle composed of charging time and non-charging time;
   - a detection and comparison circuit connected to the timer and the charging controller, the detection and comparison circuit detecting the voltage level of the battery after the battery is finished charging and issuing a warning if the voltage battery is detected to be less than a critical value for two charging times, wherein the critical value is the voltage of normal battery with one less pole;
   - a counter connected to the detection and comparison circuit and the charging controller and having an output connected to a warming unit, the counter counting number of recharging cycle;
   - a duration selector connected between the counter and the charging controller and turning off the charging circuit after a predetermined termination time.

2. The charging device with battery detection and protection function as in claim 1, wherein the warming unit is a light emitting diode or an alarm.

3. The charging device with battery detection and protection function as in claim 1, wherein the predetermined duration is 12 or 24 hours or other time.

4. The charging device with battery detection and protection function as in claim 1, wherein the charging controller is a controlling chip.

* * * * *